(No Model.) 4 Sheets—Sheet 1.
C. F. HINMAN & M. G. BUNNELL.
DITCHING AND GRADING MACHINE.
No. 554,875. Patented Feb. 18, 1896.
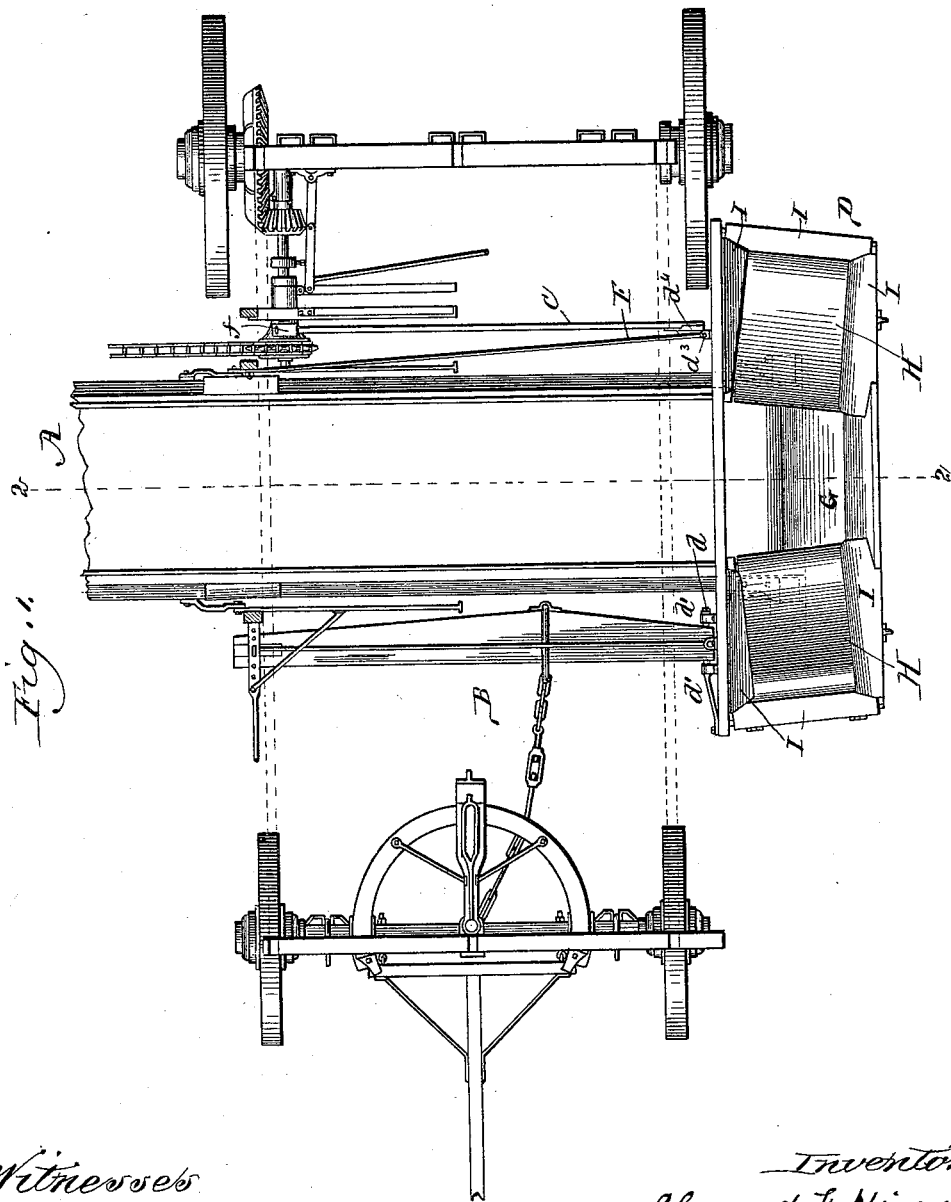
Witnesses
W. Rossiter
Fredk. H. Wells.
Inventors
Clement F. Hinman
Morton G. Bunnell
By Chas. G. Page
Atty.

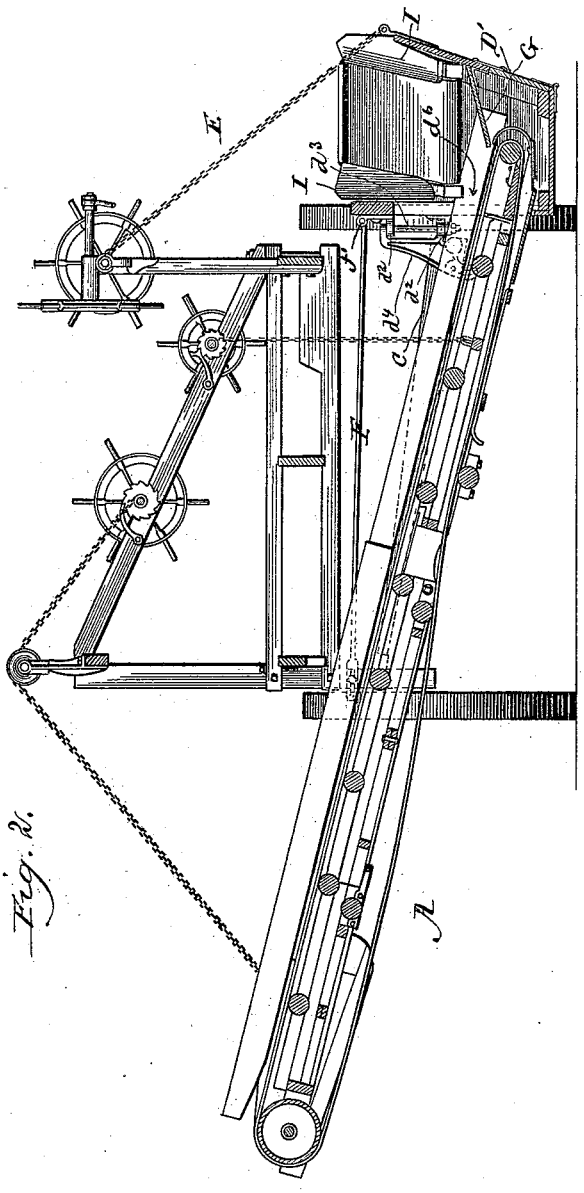

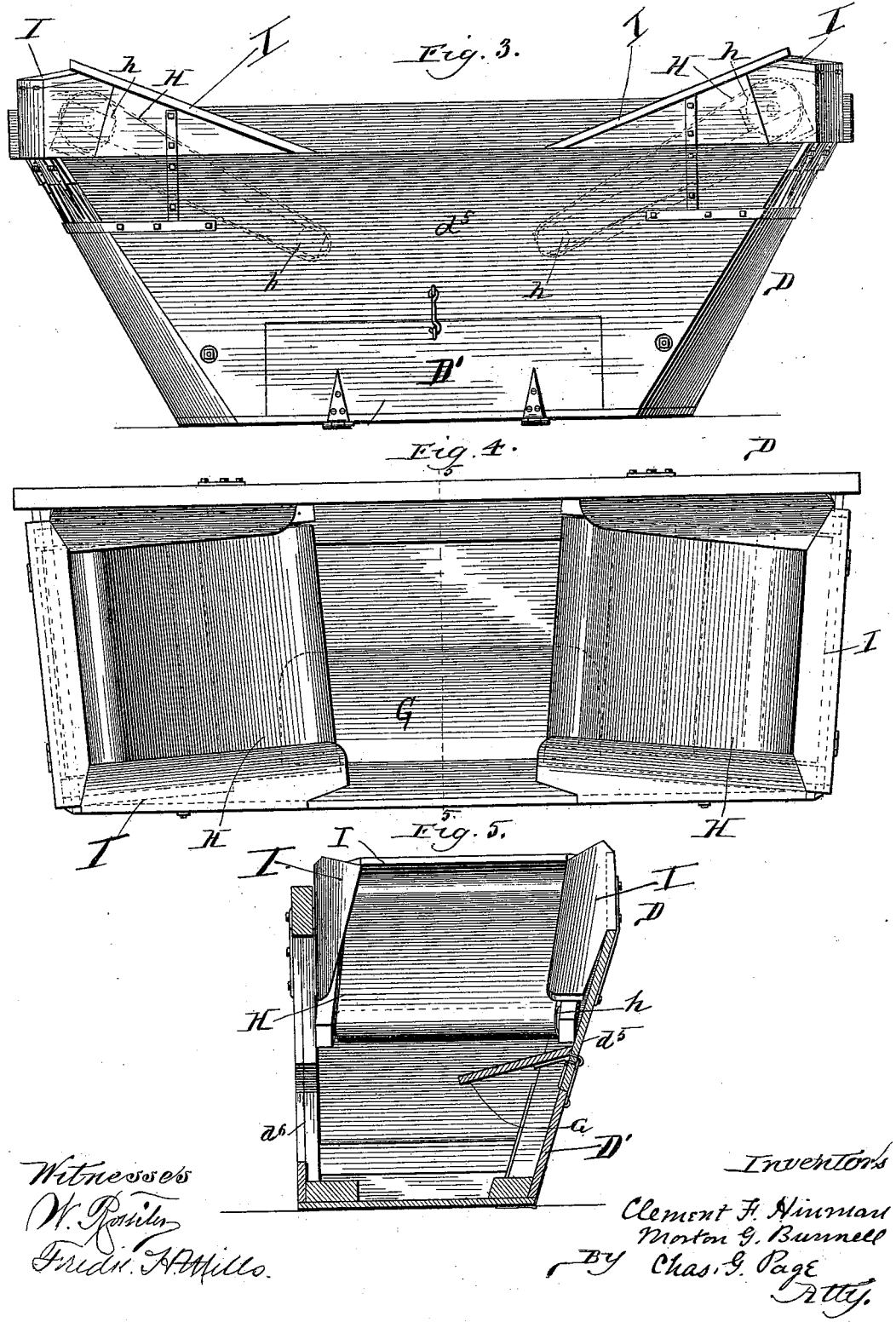

(No Model.) 4 Sheets—Sheet 4.
C. F. HINMAN & M. G. BUNNELL.
DITCHING AND GRADING MACHINE.
No. 554,875. Patented Feb. 18, 1896.
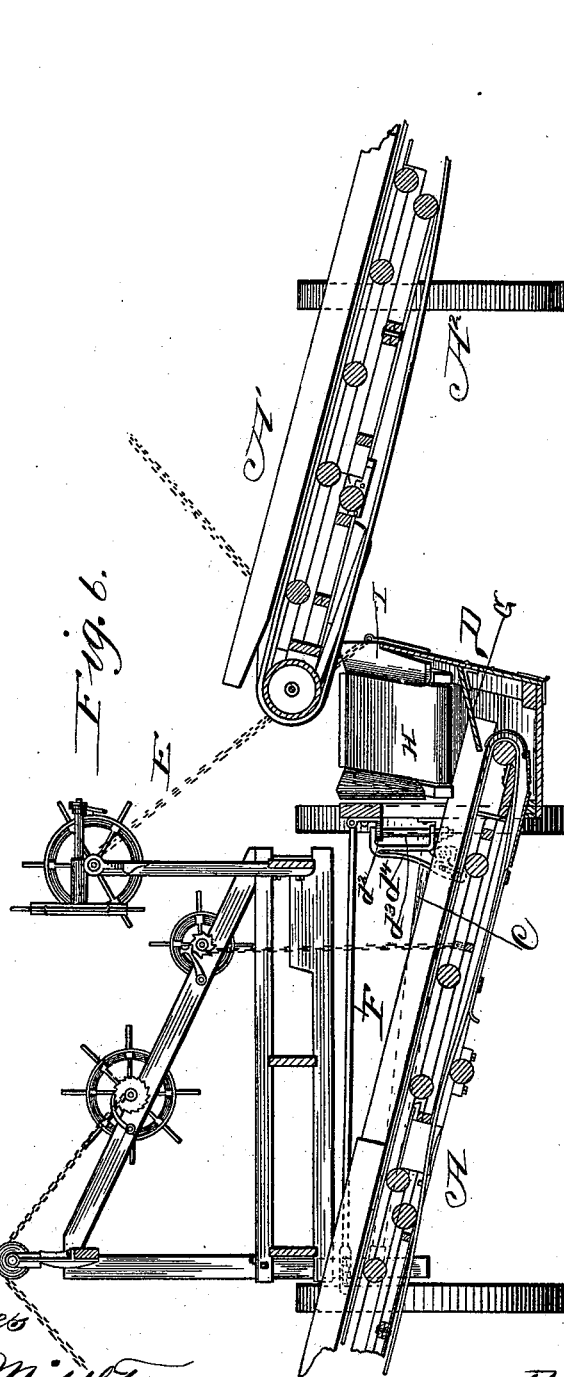

UNITED STATES PATENT OFFICE.

CLEMENT F. HINMAN AND MORTON G. BUNNELL, OF CHICAGO, ILLINOIS, ASSIGNORS TO FREDERICK C. AUSTIN, OF SAME PLACE.

DITCHING AND GRADING MACHINE.

SPECIFICATION forming part of Letters Patent No. 554,875, dated February 18, 1896.

Application filed July 17, 1891. Serial No. 399,809. (No model.)

*To all whom it may concern:*

Be it known that we, CLEMENT F. HINMAN and MORTON G. BUNNELL, both citizens of the United States, residing at Chicago, in the county of Cook and State of Illinois, have invented a certain new and useful Improvement in Grading and Ditching Machines, of which the following is a specification.

Our invention, while applicable to various constructions of grading and ditching machines, is particularly serviceable as an improved attachment to a construction of grading and ditching machines embodied in Letters Patent of the United States No. 393,467, dated November 27, 1888, granted to W. J. Edwards for grading and ditching machines, and is designed as a further improvement upon the hopper attachment involved in application for Letters Patent of the United States filed on or about March 25, 1890, by Morton G. Bunnell, one of the present applicants, and serially numbered 345,271.

During the operation of grading or excavating so as to form a road-bed it becomes at times desirable to deliver the plowed-up soil at a greater distance than can be accomplished by the use of a single machine provided with a transversely-arranged inclined elevating-conveyer, which receives the soil from a plow at one side of the machine and delivers such plowed-up soil at the opposite side of the machine. In said application, Serial No. 345,271, it is proposed to provide two grading and ditching machines, such as illustrated in said Patent No. 393,467, and to remove the plow from one of them and temporarily substitute therefor a hopper under such arrangement, that a machine thus provided with a hopper can be run alongside a machine provided with a plow, so that while one machine plows up the soil and delivers the same to its elevating-conveyer the latter will discharge the soil into the hopper of the other machine which is equipped with an elevating-conveyer arranged to receive the soil from the hopper and convey the same to the point of ultimate discharge.

The objects of our invention are to simplify the construction and mode of application of the hopper attachment for a machine such as in said patent or other desired machine adapted for the attachment for a plow and plow-beam as in an ordinary plow and carrier grading and ditching machine, to avoid change in the construction of the elevating-conveyer, so that one and the same elevating-conveyer can be used alternately in conjunction with a plow and a hopper attachment, and to provide certain novel and improved details, as hereinafter described.

To the attainment of the foregoing and other useful ends our invention consists in matters hereinafter set forth, and particularly pointed out in the claims.

In the accompanying drawings, Figure 1 is a top plan view of the portion of the machine below the body-frame and corresponds with Fig. 14 in said Patent No. 393,467, the plow-beam and plow being, however, removed and our improved hopper attachment substituted for the same. Fig. 2 is a vertical transverse section taken through the machine on line 2 2 in Fig. 1, and generally corresponding with Fig. 8 of said patent, it being understood that we have for convenience of illustration omitted various details of the machine embodied in said Letters Patent. Fig. 3 represents the hopper attachment in side elevation and on a scale somewhat larger than in the preceding figures. Fig. 4 is a top plan view of Fig. 3. Fig. 5 is a cross-section of the hopper attachment on line 3 3 in Fig. 4. Fig. 6 shows a portion of the machine represented in Fig. 2 with a portion of a grading and ditching machine alongside the same, as hereinafter explained.

In said drawings, the machine partially represented is understood to involve the construction embodied in the aforesaid Letters Patent, and hence the same need not be herein particularly described. It is, however, desirable to note that the elevating-conveyer A is supported upon the wheeled carriage and is arranged transversely to the length of the machine, so that when the plow is used the endless belt of the elevating-conveyer may receive the soil from the plow at one side of the machine and deliver such soil at the opposite side of the machine; also that B indicates the forwardly-arranged stay-bar, and C the rearwardly-arranged stay-bar, which said bars are pivotally connected with the plow-beam by hinge-joints when the plow is used. D indicates the hopper, which is adapted for arrangement alongside the machine in place of the plow-beam and plow, it being understood that when the hopper is to be brought into service the plow-beam can be detached from the stay-bars B and C, and also detached from the suspending-chains, which are employed in said Letters Patent, as a means for raising and lowering the plow.

As a means for suspending the hopper alongside the machine, we attach it to the chains previously used for raising and lowering the plow, one of said chains, E, being illustrated in Fig. 2. We also attach the hopper to the free ends of the stay-bars B and C, as illustrated in Fig. 1. As a convenient way of thus attaching the hopper to the stay-bar B, we provide a pintle $d$, which can be inserted through a horizontal recess in the end portion of the stay-bar B, and then secured in bearings $d'$, Fig. 1, upon one side of the hopper; and we further provide upon said side of the hopper a bearing or bearings $d^2$, Fig. 2, for a vertical pivot-bolt $d^3$, by which the said bearing can be hinged to a plate or hinge-leaf $d^4$ on the rear stay-bar, C. As an adjunct or auxiliary to the rear stay-bar, C, we also provide a stay-bar F adjustably attached at one end to a bearing $f$, Fig. 1, at one side of the machine, and at its other end connected with the hopper in any suitable way—as, for example, it can be connected with the pivot-bolt $d^3$, as indicated in Fig. 1, or it can be separately hinged to the hopper, as indicated at $f'$ in Fig. 2.

The outer side, $d^5$, of the hopper desirably slopes toward its inner side, which latter is provided with an opening $d^6$, adapted in width to permit the receiving end of the elevating conveyer to enter the lower portion of the space within the hopper and also adapted in height to provide through the inner side of the hopper at a point over the endless conveying-belt a suitable passage for the soil deposited upon said belt, which provides in effect the soil-receiving portion of the bottom. We also provide within the hopper an inclined deflector G, which is attached to the inner wall of the outer portion of the hopper and arranged to extend to some extent over such portion of the endless conveyer-belt as is within the hopper, in which way the mouth of the hopper can be made comparatively wide from side to side without providing the elevating-conveyer with an extension at its receiving end or without providing a longer elevating-conveyer. The elevating-conveyer embodied in said patent is arranged so that it can be adjusted in the direction of its length, and such adjustment is made in practice when the plow-beam is removed and the hopper applied, so that the receiving end of the elevating-conveyer can be thrust into the hopper, but by employing the deflector no unusual adjustment of the elevating-conveyer need be provided for.

In order to permit the use of a hopper much longer than the width of the conveyer-belt, we provide at each end of the hopper an endless apron H. These aprons are arranged within the hopper with their leaves in an inclined position, in which way the inclination of the upper leaves of the aprons downwardly toward the conveyer-belt will direct the soil thrown upon such aprons onto the conveyer-belt. These aprons are arranged upon upper and lower idler-rolls $h$, (indicated by dotted lines in Fig. 3,) said rolls being journaled in suitable bearings on the side of the upper leaves. These aprons receive the soil upon their upper leaves, and hence constitute receiving-aprons, and, being inclined and arranged upon idler-rolls, said aprons can be caused to operate solely by reason of the weight of the soil upon their upper leaves. Said aprons are also carrying-aprons, since they not only receive the soil, but also carry the same to the long apron of the elevating-conveyer, and being operated solely by the weight of the soil thereon, gearing or the like for operating said aprons is dispensed with. We also provide the hopper with guides I arranged to deflect the soil onto the conveyer-belt and also prevent soil from falling between the sides of the hopper and the edges of the aprons. At the outer side we provide the hopper with a door D', whereby ready access can be had to the interior of the hopper for the purpose of cleaning out the same.

In Fig. 6 we have shown a portion of the machine illustrated in Fig. 2 and have shown alongside the same the discharge-end portion A' of the elevating-conveyer and one of the wheels $A^2$ of an ordinary plow and carrier grading and ditching machine which can be driven alongside the machine carrying the hopper, so as to discharge into the latter.

From the foregoing it will be seen that, although the plow may be removed and the hopper applied, the machine is still a machine for grading and ditching service.

What we claim as our invention is—

1. The combination with a machine for grading and ditching work having a wheeled carriage and an elevating-conveyer supported thereon, of an attachment comprising a hopper adapted to receive the receiving end of the elevating-conveyer of such machine and provided with idler-rolls and endless receiving and conveying aprons placed upon the idler-rolls and arranged to discharge onto the elevating-conveyer when the latter is introduced within the hopper, said aprons being inclined and being operated solely by the weight of the soil thereon, substantially as described.

2. The combination with a machine for grading and ditching service having a wheeled carriage and an elevating-conveyer, of an attachment comprising the hopper containing idler-rolls, inclined aprons H arranged upon the idler-rolls, and guards, for directing the soil onto the aprons, which latter are operated solely by the weight of the soil thereon, substantially as set forth.

CLEMENT F. HINMAN.
MORTON G. BUNNELL.

Witnesses:
HARRY COBB KENNEDY,
CHAS. G. PAGE.